(12) United States Patent
Nicholson et al.

(10) Patent No.: US 12,466,070 B2
(45) Date of Patent: Nov. 11, 2025

(54) AUTOMATED O-RING PROCESSING STATIONS AND RELATED METHODS

(71) Applicant: ATS CORPORATION, Cambridge (CA)

(72) Inventors: Kenneth Wayne Nicholson, Smiths Falls (CA); Philip David Munroe, Yarker (CA); James Mark McLean, Kingston (CA); Robert James Macgregor, Odessa (CA); David Andrew Tait, Kingston (CA); Gustavo Barea, Cambridge (CA); Roger Craig Hogan, Maryhill (CA)

(73) Assignee: ATS CORPORATION, Cambridge (CA)

( * ) Notice: Subject to any disclaimer, the term of this patent is extended or adjusted under 35 U.S.C. 154(b) by 0 days.

(21) Appl. No.: 19/057,075

(22) Filed: Feb. 19, 2025

(65) Prior Publication Data
US 2025/0187195 A1    Jun. 12, 2025

Related U.S. Application Data

(63) Continuation of application No. 17/697,654, filed on Mar. 17, 2022, now Pat. No. 12,257,724.
(Continued)

(51) Int. Cl.
*B25J 9/16* (2006.01)
*B23P 19/08* (2006.01)
(Continued)

(52) U.S. Cl.
CPC ........... *B25J 9/1687* (2013.01); *B23P 19/084* (2013.01); *B25J 9/0093* (2013.01); *B25J 9/0096* (2013.01);
(Continued)

(58) Field of Classification Search
CPC . B23P 19/084; Y10T 29/49872; B25J 9/0093; B25J 9/0096; B25J 9/1687; B25J 15/0052
See application file for complete search history.

(56) References Cited

U.S. PATENT DOCUMENTS

| | | |
|---|---|---|
| 4,212,096 A | 7/1980 | Nagashima et al. |
| 9,904,281 B2 | 2/2018 | Nicholson et al. |
| (Continued) | | |

FOREIGN PATENT DOCUMENTS

| | | |
|---|---|---|
| CN | 209169295 U | 7/2019 |
| EP | 4066986 A1 | 10/2022 |
| (Continued) | | |

OTHER PUBLICATIONS

Extended European Search Report in EP 22163782.0 dated Aug. 30, 2022.

*Primary Examiner* — Jermie E Cozart

(57) ABSTRACT

An O-ring processing station for an automated mass production system includes: (a) at least one feed device operable to control discharge of O-rings from an output end of the feed device; (b) an indexing device having a plurality of O-ring retainers, the indexing device operable to advance each retainer to a loading position in alignment with the output end for receiving an O-ring from the feed device, and an unloading position spaced apart from the loading position for unloading the O-ring from the retainer; and (c) a pick-and-place robot including at least one end effector movable between a pick-up position in alignment with a retainer at the unloading position for removing the O-ring from the retainer, and a drop-off position spaced apart from the pick-up position for installation of the O-ring onto a workpiece.

20 Claims, 13 Drawing Sheets

Related U.S. Application Data

(60) Provisional application No. 63/167,968, filed on Mar. 30, 2021.

(51) Int. Cl.
*B25J 9/00* (2006.01)
*B25B 27/00* (2006.01)

(52) U.S. Cl.
CPC .................... *B25B 27/0028* (2013.01); *G05B 2219/39001* (2013.01); *G05B 2219/45063* (2013.01); *Y10T 29/49872* (2015.01)

(56) References Cited

U.S. PATENT DOCUMENTS

| | | |
|---|---|---|
| 10,018,985 B2 | 7/2018 | Nicholson et al. |
| 11,440,170 B2 | 9/2022 | Li et al. |
| 2011/0209320 A1 | 9/2011 | Connolly |
| 2020/0324377 A1 | 10/2020 | Mayes et al. |

FOREIGN PATENT DOCUMENTS

| | | |
|---|---|---|
| IT | BS20100162 A1 | 4/2012 |
| JP | S58 110320 U | 7/1983 |
| JP | S63 144135 U | 9/1988 |
| JP | H01 121137 A | 5/1989 |
| JP | H02 145222 A | 6/1990 |
| JP | H08 47827 A | 2/1996 |
| JP | 2004338055 A | 12/2004 |
| WO | 2014049863 A1 | 4/2014 |

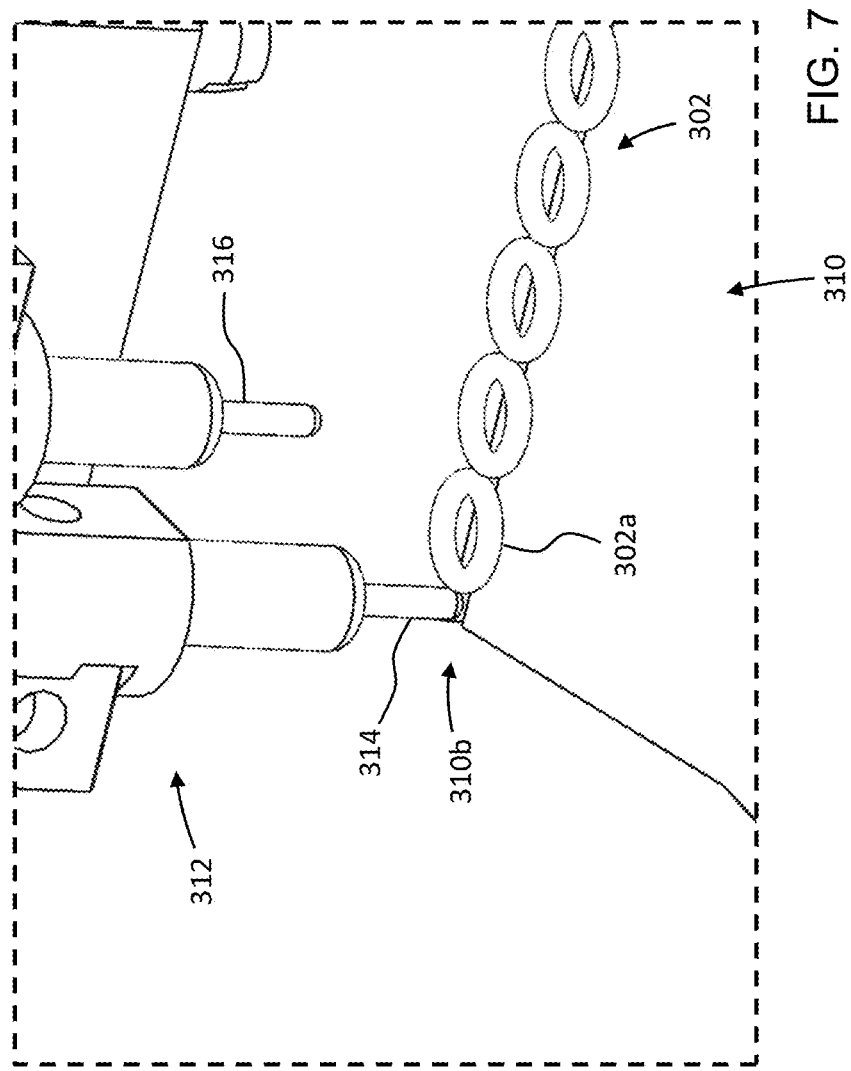

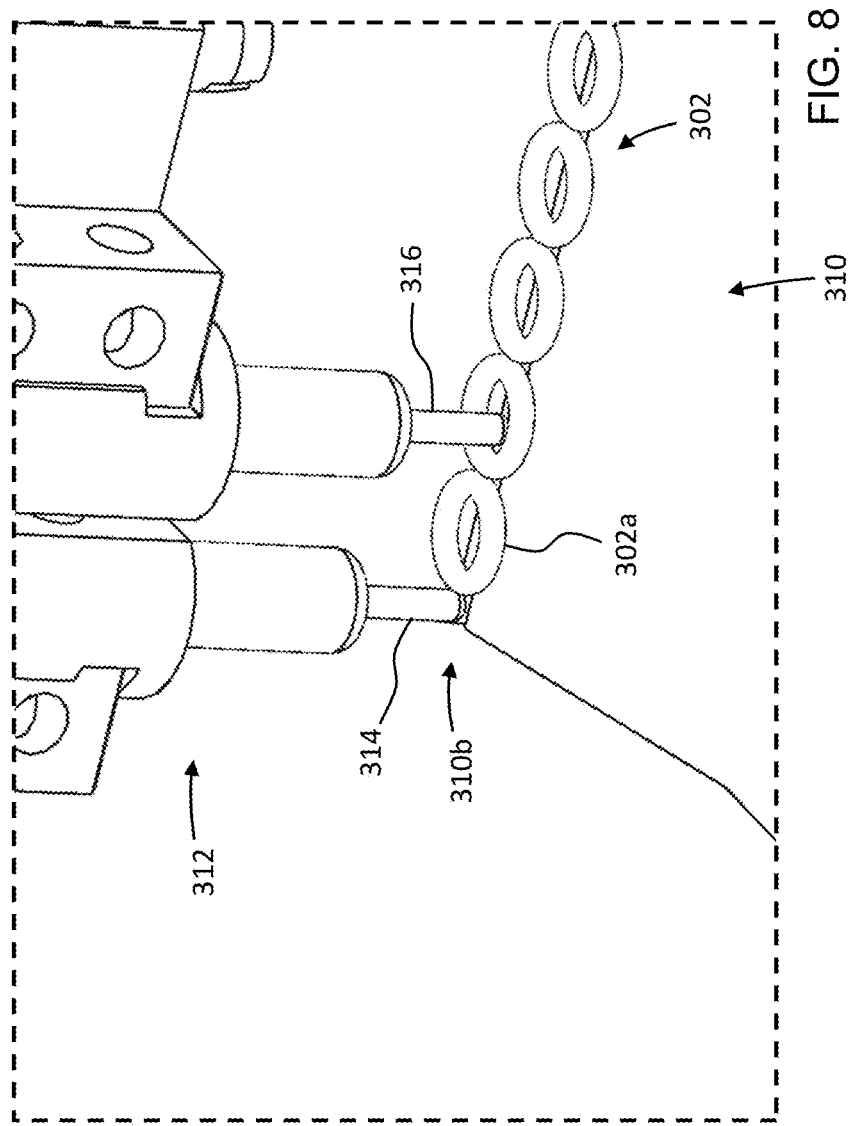

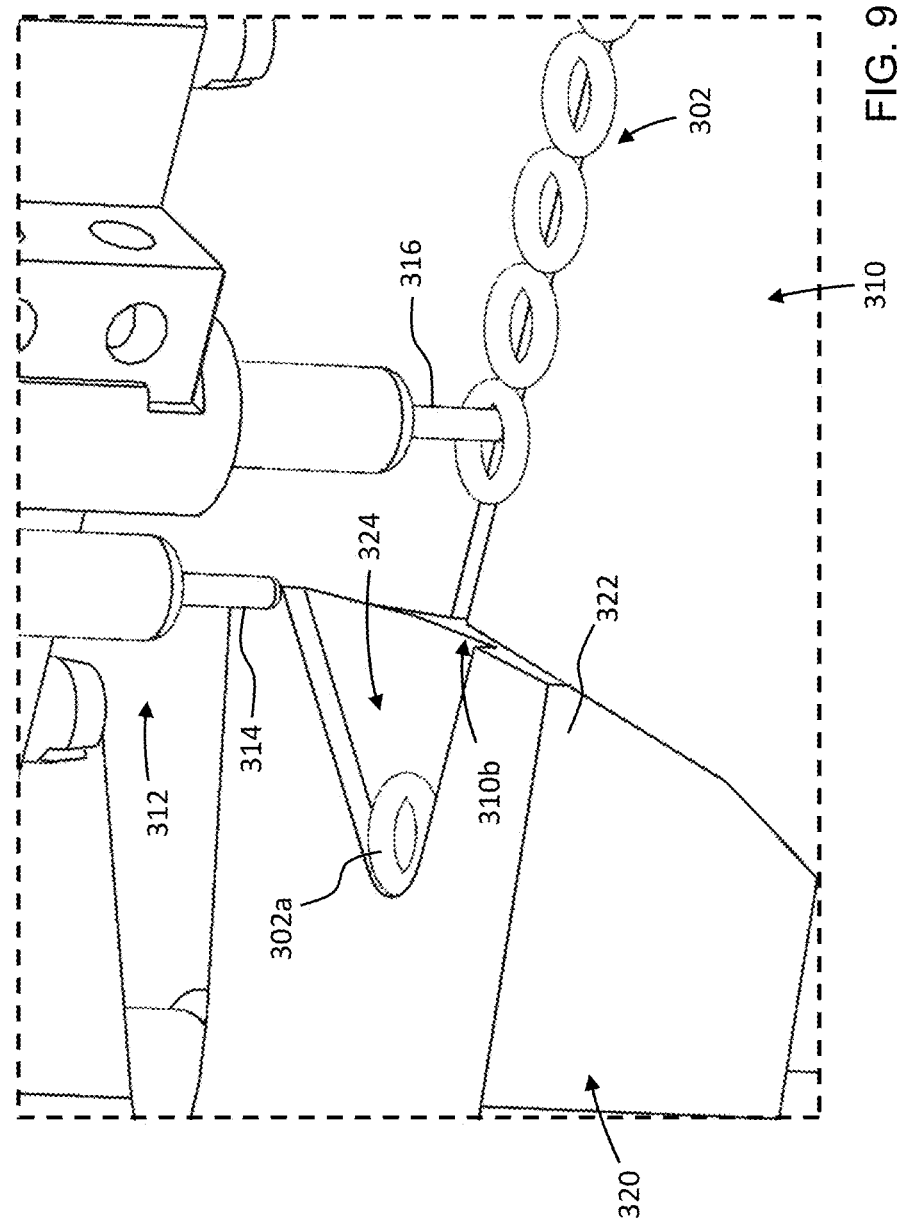

AUTOMATED O-RING PROCESSING STATIONS AND RELATED METHODS

CROSS-REFERENCE TO RELATED APPLICATIONS

This application is a continuation of U.S. patent application Ser. No. 17/697,654, filed Mar. 17, 2022, which claims the benefit of U.S. Provisional Patent Application No. 63/167,968, filed Mar. 30, 2021. The entire contents of U.S. patent application Ser. No. 17/697,654 and U.S. Provisional Patent Application No. 63/167,968 are hereby incorporated by reference for all purposes.

FIELD

The present disclosure relates to systems and methods for processing O-rings in an automated mass production process.

BACKGROUND

U.S. Pat. No. 9,904,281 (Nicholson et al.) discloses an automated method of assembling or processing components using computer numerical controlled drives to decouple the stages of delivering components to a tool, into a series of separately programmable stages, namely, a component loading stage, a component separating stage, an accelerating stage, and a delivery stage, wherein the timing, position, speed, velocity, and acceleration of each component during each stage is selected through programming of the computer numerical controls.

U.S. Pat. No. 10,018,985 (Nicholson et al.) discloses a device, system and method of automated manufacture comprising: delivering a workpiece with a delivery device; receiving the workpiece with a receiving device, the delivering of the workpiece and the receiving of the workpiece being electronically synchronized; processing the workpiece with a processing tool while the workpiece is on the receiving device; transferring the workpiece to a completion device, the ejection of the workpiece and the transferring of the workpiece being electronically synchronized. In particular the workpiece may comprise: a platform with mounts supporting a first component in a selected orientation; and a locating surface, the method comprising: engaging and disengaging the locating surface of the workpiece with releasable connectors on the delivery device, on the receiving device and on the completion device.

SUMMARY

The following summary is intended to introduce the reader to various aspects of the applicant's teaching, but not to define any invention.

According to some aspects, a method of processing O-rings in an automated mass production system includes: (a) advancing an O-ring retainer of an indexing device toward a loading position in alignment with an output end of a feed device; (b) discharging a leading O-ring from the output end of the feed device in electronic synchronization with advancement of the O-ring retainer to the loading position to initiate loading of the O-ring into the retainer prior to the retainer arriving at the loading position; (c) after loading the O-ring into the retainer, advancing the retainer away from the loading position toward an unloading position; and (d) moving an end effector in electronic synchronization with advancement of the retainer to the unloading position to synchronize arrival of the retainer at the unloading position with arrival of the end effector at a pick-up position in alignment with the O-ring in the retainer at the unloading position for pick up of the O-ring by the end effector.

In some examples, the end effector arrives at the pick-up position after the retainer arrives at the unloading position.

In some examples, the method further includes: (e), after (d), operating the end effector to grip the O-ring.

In some examples, the method further includes: (f), after (e), moving the end effector in electronic synchronization with advancement of a carrier along a track to synchronize arrival of the carrier at a stop position with arrival of the end effector at a drop-off position in alignment with a workpiece held by the carrier at the stop position for installation of the O-ring on the workpiece by the end effector.

In some examples, wherein the end effector arrives at the drop-off position after the carrier arrives at the stop position.

In some examples, the method further includes expanding the O-ring during movement of the end effector from the pick-up position toward the drop-off position and releasing the O-ring onto the workpiece when at the drop-off position.

In some examples, the indexing device includes a plurality of retainers, and the method comprises performing steps (a) to (f) for each retainer.

In some examples, the retainers are fixed to a rotary platform and advanced through rotation of the platform about a vertical axis.

In some examples, the method further includes, prior to (b), separating a leading O-ring from a stream of trailing O-rings in the feed device by closing a separation gate rearward of the O-ring to inhibit advancement of the trailing O-rings toward the output end, and wherein (b) includes (i) opening a discharge gate at the output end of the feed device to permit discharge of a leading O-ring from the output end and (ii) accelerating the leading O-ring toward the output end.

According to some aspects, a method of processing O-rings in an automated mass production system includes: (a) advancing a plurality of O-ring retainers of an indexing device sequentially through a loading position in alignment with an output end of a feed device to transfer O-rings from the output end to the retainers, the retainers arranged in a plurality of retainer sets, each retainer set including at least two retainers; (b) after loading an O-ring in each retainer of a retainer set, advancing the retainer set toward an unloading position spaced apart from the loading position; and (c) moving a plurality of end effectors together in electronic synchronization with advancement of the retainer set to the unloading position to synchronize arrival of the retainer set at the unloading position with arrival of the end effectors at a pick-up position, in which each end effector is in alignment with an O-ring held by a corresponding retainer of the retainer set at the unloading position for simultaneous pick up of the O-rings in the retainer set by the end effectors.

In some examples, the method further includes: (d), after (c), operating the end effectors to simultaneously grip the O-rings in the retainer set at the unloading position.

In some examples, the method further includes: (e), after (d), moving the end effectors together in electronic synchronization with advancement of a carrier along a track to synchronize arrival of the carrier at a stop position with arrival of the end effectors at a drop-off position, in which each end effector is in alignment with a corresponding workpiece held by the carrier at the stop position for simultaneous installation of the O-rings on the workpieces by the end effectors.

In some examples, the method further includes repeating (a) to (e) for each retainer set of the indexing device to install O-rings on workpieces held by subsequent carriers in a continuous mass production process.

In some examples, (a) includes advancing a first retainer of a first retainer set to the loading position while advancing a second retainer set to the unloading position. In some examples, (a) includes advancing a second retainer of the first retainer set to the loading position while advancing the second retainer set away from the unloading position toward the loading position. In some examples, (a) includes advancing the second retainer of the first retainer set to the loading position while moving the end effectors toward the drop-off position to install O-rings picked up from the second retainer set.

According to some aspects, an O-ring processing station for an automated mass production system includes: (a) at least one feed device operable to control discharge of O-rings from an output end of the feed device; (b) an indexing device including a platform having a plurality of O-ring retainers, the platform operable to advance each retainer to a loading position in alignment with the output end for receiving an O-ring from the feed device, and an unloading position spaced apart from the loading position for unloading the O-ring from the retainer; (c) a pick-and-place robot including at least one end effector movable between a pick-up position in alignment with an O-ring in a retainer at the unloading position for removing the O-ring from the retainer, and a drop-off position spaced apart from the pick-up position and in alignment with a workpiece for installation of the O-ring by the end effector; and (d) a control system for electronically synchronizing operation of the feed device, indexing device, and pick-and-place robot, the control system configured to: (i) operate the platform to advance each retainer through the loading and unloading positions; (ii) control discharge of a leading O-ring from the output end of the feed device in electronic synchronization with advancement of a corresponding retainer to the loading position to initiate loading of the O-ring in the retainer prior to the retainer arriving at the loading position; and (iii) after the O-ring is loaded in the retainer, control movement of the end effector in electronic synchronization with advancement of the retainer to the unloading position to synchronize arrival of the retainer at the unloading position with arrival of the end effector at the pick-up position for pick up of the O-ring by the end effector.

In some examples, the production system includes a track having a plurality of carriers movable along the track, each of the carriers for holding at least one workpiece, and the control system is configured to control movement of the end effector in electronic synchronization with advancement of a carrier along the track to synchronize arrival of the carrier at a stop position with arrival of the end effector at the drop-off position, in which the end effector is in alignment with the workpiece held by the carrier at the stop position for installation of the O-ring on the workpiece by the end effector.

In some examples, the platform is rotatable about a vertical axis for advancing the retainers through the loading and unloading positions.

In some examples, the retainers are arranged in a plurality of retainer sets, each retainer set including at least two retainers moveable together to the unloading position, and wherein the robot includes a plurality of end effectors movable together to the pick-up position, in which each end effector is in alignment with an O-ring in a retainer of a retainer set at the unloading position for picking up the O-rings simultaneously from the retainer set at the unloading position.

BRIEF DESCRIPTION OF THE DRAWINGS

The drawings included herewith are for illustrating various examples of apparatuses, systems, and processes of the present specification and are not intended to limit the scope of what is taught in any way. In the drawings:

FIGS. 7 to 10 are enlarged perspective views of portions of feed and indexing devices of the station of FIG. 5, showing transfer of an O-ring from the feed device to a retainer of the indexing device.

DETAILED DESCRIPTION

Figure 1:
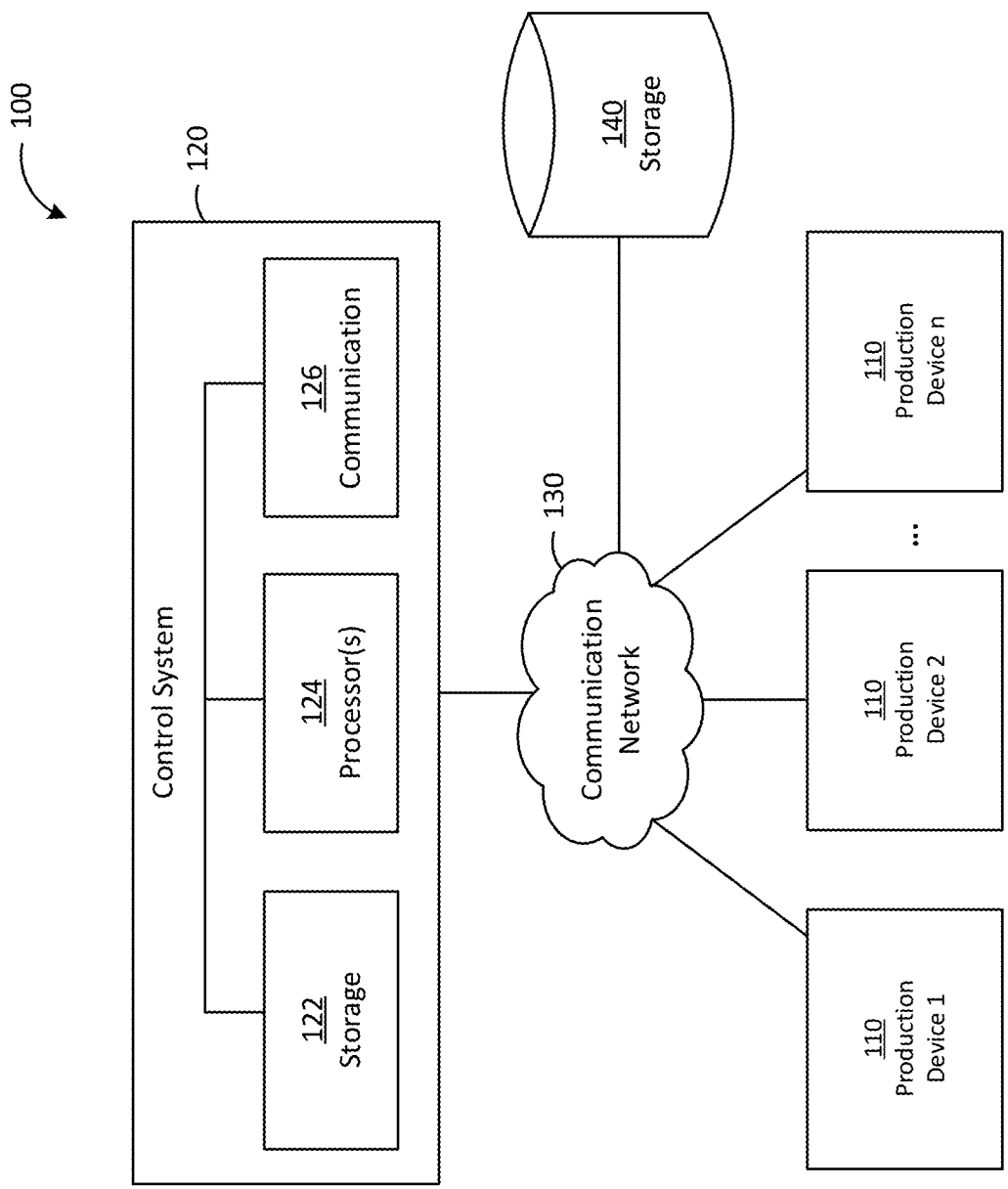
FIG. 1 is a schematic of an example automated mass production system.

Various apparatuses, systems, or processes will be described below to provide an example of an embodiment of each claimed invention. No embodiment described below limits any claimed invention and any claimed invention may cover apparatuses, processes, or systems that differ from those described below. The claimed inventions are not limited to apparatuses, systems, or processes having all of the features of any one apparatus, system, or process described below or to features common to multiple or all of the apparatuses, systems, or processes described below. It is possible that an apparatus, system, or process described below is not an embodiment of any claimed invention. Any invention disclosed in an apparatus, system, or process described below that is not claimed in this document may be the subject matter of another protective instrument, for example, a continuing patent application, and the applicants, inventors, or owners do not intend to abandon, disclaim, or dedicate to the public any such invention by its disclosure in this document.

A production process can involve processing (e.g. feeding, indexing, transferring, assembling, transporting, validating, etc.) parts to produce a product. During the production process, the part requiring further processing (for example, subcomponent, assembly, or partially finished product) can be referred to as a workpiece. The workpiece can be moved through a production system among various production devices that operate on the workpiece(s) in production of the product.

In some applications, a production process may require assembly of parts together, for example, installation of an O-ring on another workpiece. According to some aspects of the present disclosure, an O-ring processing system can include a plurality of production devices electronically synchronized to improve efficiency of O-ring processing in a continuous mass production process. According to some aspects, the production devices of the O-ring processing system can include one or more presentation devices (e.g. feed, indexing, and/or transport devices) and one or more processing devices (e.g. pick-and-place assembly robots) operable in electronic synchronization with one another to facilitate efficient O-ring processing. According to some aspects the O-ring processing system can include a feed device for separating and delivering a leading O-ring from a stream of O-rings, an indexing device for receiving O-rings from the feed device and presenting the O-rings for processing, and a pick-and-place robot for transferring the O-rings from the indexing device to another workpiece for installation thereon. The workpiece can be held by a transport device (e.g. carrier) movable along a track for transporting the workpiece from and/or to other production devices for further processing. Operation of the feed device, indexing device, pick-and-place robot, and carrier can be electronically synchronized for improved efficiencies relative to some conventional O-ring processing systems.

Referring to FIG. 1, a schematic of an example automated production system 100 is shown. In the example illustrated, the production system 100 includes a plurality of production devices 110 for processing workpieces, a production control system 120 for controlling operation of the production devices 110 and/or other system components to facilitate a mass production process, a communication network 130 for enabling communication among system components, and a production system storage component 140 for storing relevant data for the production system 100 (e.g. operational and/or control data relating to the production devices 110 and/or other aspects of the system 100).

In the example illustrated, the control system 120 includes a control system storage component 122, one or more system processors 124, and a system communication component 126. The system processor 124 controls operation of the control system 120. In some examples, the system processor 124 and processors at the production devices 110 cooperate to control operation of the system 100 (e.g. through determination and/or processing of control parameters and generation of control signals for operation and synchronization based on the control parameters).

In some examples, the storage component 122 (e.g. memory) can store data received from the production devices 110, data for coordinating operation of the production devices 110, property data in respect of each production device 110, etc. The storage component 122 can store computer programs executable by the system processor 124 to facilitate communication among and operation of the system components.

The production system storage component 140 can be accessible via the communication network 130 and provided in addition to or in lieu of the control system storage component 122. In some examples, the control system storage component 122 can store current operating data corresponding to current operation of the control system 120 (e.g. current position, speed, velocity, and/or acceleration of tooling), and the production system storage component 140 can store data for future use. In some examples, the storage component 140 can include third party data storage. The storage component 140 can store information about the production devices 110, including operating data, profile data (e.g., servo-motor profile data), motion data (e.g., tool motion data), part/workpiece/product data, etc. Such data can be stored in the storage component 140 for subsequent retrieval by the production devices 110 and/or control system 120, for example, through download via communication network 130.

The communication network 130 can carry data to enable communication among system components (e.g. among the control system 120, production devices 110, storage component 140, and/or other devices/components), and can be a wired and/or wireless communication network. In some examples, components of the system 100 (including, for example production devices 110 and control system 120) can include wireless communication interfaces to enable wireless communication through communication network 130.

Figure 2:
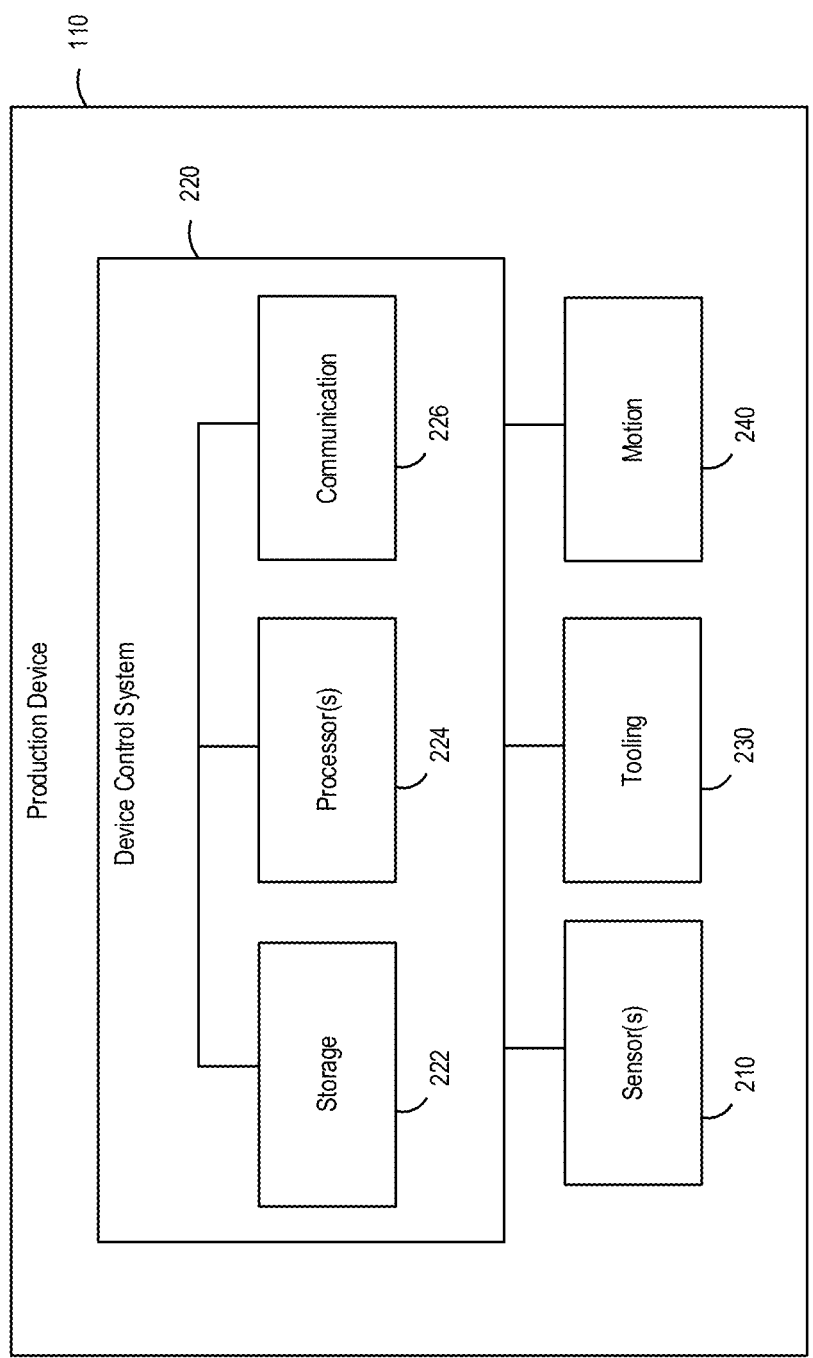
FIG. 2 is a schematic of an example production device of the system of FIG. 1.

Referring to FIG. 2, a block diagram representing an example production device 110 is shown. In the example illustrated, the production device 110 includes a device control system 220, a sensor system 210, tooling 230, and a motion system 240.

In the example illustrated, the device control system 220 includes a device processor 224, a device storage component (e.g. memory) 222, and a device communication component 226. The device control system 220 is operable to control operation of the production device 110, and can collect and store sensor, tooling, and motion data for the production device 110 in the device storage component 222 for operational use and/or for providing to the control system 120 through network 130 to facilitate electronic synchronization of production devices 110.

The device storage component 222 can store data for operation of the production device 110 and/or to facilitate electronic synchronization. Example data can include, for example, operating data, part data, tool data, motion data, sensor data, etc. The sensor system 210 can include one or more sensors (e.g. range-finding, motion, vision systems, etc.) for collecting operational and/or environmental data for facilitating the production process. Each production device 110 can be equipped with a motion system 240 for movement of the production device 110 and/or components thereof (e.g. sensors, tooling, etc.). The motion system 240 can include, for example, one or more servo-motors and/or other actuators.

The production devices 110 can be equipped with tooling 230 for engaging with and processing workpieces. Tooling 230 can be used for, for example, part handling, manipulation, transport, etc. The operation of tooling 230 can be controlled by the device control system 220 based on, for example, sensor data from the sensor system 210 and operational data for the production device 110 or other production devices 110 and/or system components.

The tooling 230 can be in the form of, for example, one or more workpiece presentation tools for presenting the workpieces at predetermined locations for delivery and/or further processing and/or one or more workpiece processing tools for performing value-added operations on the workpieces. The workpiece presentation tools can be part of, for example, one or more transports, carriers, conveyors, screws, indexer, actuators, or other devices for, for example, separating a lead workpiece from other workpieces and delivery to another presentation and/or processing tool for subsequent processing. In some examples, the presentation tools can be part of a feed device and configured to, for example: load a workpiece at a delivery position at a leading end of a stream of like workpieces; separate the workpiece at the delivery position from the other workpieces; accelerate the workpiece; and deliver the workpiece at a predetermined delivery time, delivery position, delivery speed, and moving along a delivery trajectory. The workpiece presentation tool can be configured to deliver workpieces before loading one or more subsequent workpieces at the delivery position. In some examples, the workpiece presentation tools can be part of an indexing device and configured to, for example: receive one or more workpieces at a loading position (e.g. from a feed device); accelerate workpieces toward an unloading position; and present the workpieces at the unloading position for further processing. In some examples, the workpiece presentation tools can be part of a transport device and configured to, for example, receive one or more workpieces, accelerate the workpieces toward a stop position (e.g. along a transport track) for a processing station, and present the workpieces at the processing position for processing by a processing tool.

Processing tools can be configured to conduct one or more value-added operations on or with the workpieces. For example, the processing tools can be configured to manipulate a workpiece, assemble two or more workpieces together, reorient a workpiece for further processing, etc. In some examples, processing tools can include, e.g. end effectors such as manipulators and/or grippers for part manipulation and/or assembly. In some examples, the processing tools can be part of a pick-and-place robot and can be configured to, for example, receive one or more workpieces from a workpiece presentation tool (e.g. of an indexing device); move the workpiece toward a processing position; and process the workpiece at the processing position (e.g. install the workpiece onto another workpiece presented adjacent the processing position, for example, by a transport device).

Machine-readable instructions stored in storage component 222 (or in storage 122, 140) can cause the device control system 220 (and/or 120) to execute various methods disclosed herein including generation of one or more signals (e.g., output data) useful in operation of the production devices 110. Such machine-readable instructions can be incorporated into one or more computer program products which can be stored on suitable medium or media. In some embodiments, the machine-readable instructions can be executable by processor 224 and/or 124 for generation of signals useful in electronic synchronization of two or more operations carried out by the tooling 230 (e.g. by presentation and processing tools) of the production devices 110. The machine-readable instructions can be executable by the processor(s) for determination and/or selection of control parameters for operation of the tooling 230 and generate signals representative of the control parameters. For example, the machine-readable instructions can be configured to cause processor 224 and/or 124 to generate signals useful in the electronic synchronization of the delivery of workpieces by a workpiece presentation tool and receipt of the workpieces by a processing tool.

The synchronization of two or more operations performed by the tooling 230 of one or more production devices 110 can utilize electronic camming (e.g. instead of mechanical cams, gears, or linkages). In various embodiments, the use of such electronic synchronization can facilitate system flexibility and improve system performance relative to some more-conventional systems utilizing mechanical synchronization means. In some examples, storage component 222 (and/or 122, 140) can hold data representative of one or more cam profiles to be used in the operation of the tooling 230 of one or more production devices 110. For example, such cam profile(s) can be in tabular form and can include corresponding positions representative of synchronized trajectories to be followed by the tooling 230 during operation. In some examples, one tooling component 230 can be operated as a master device and another tooling component 230 can be operated as a slave device executing movements based on the execution of movements by the master device in order to substantially maintain synchronization between the slave device and the master device. In some examples, the production devices 110 can include one or more master devices and one or more respective slave devices. For example, multiple slave devices can be electronically cammed with a master device.

The machine-readable instructions can be configured to cause processor 224 and/or 124 to generate signals useful in electronic synchronization (e.g. camming) of the delivery of a workpiece by a presentation tool and of receipt of the workpiece by a processing tool (or another presentation tool). In some embodiments, the machine-readable instructions can be configured to cause the processor(s) to generate signals useful in electronic synchronization of loading, separation, acceleration, and delivery of a workpiece by a presentation tool and of receipt of the workpiece by a processing tool. In some examples, the machine-readable instructions can be configured to cause the processor(s) to generate signals useful in controlling movement of a workpiece along a delivery trajectory and controlling movement of a processing tool along a processing tool trajectory for electronic synchronization of the workpiece and processing tool.

In some examples, the machine-readable instructions can be configured to cause processor 224 and/or 124 to generate signals useful in controlling at least some aspect of the processing of a workpiece. For example, such processing can include one or more value-added operations that can be carried out by the processing tool. Such value-added operation can include, for example, assembly of two or more workpieces together through installation of one workpiece on another workpiece. The machine-readable instructions may, for example, be configured to cause the processor(s) to generate signals useful in electronic synchronization of the processing of a workpiece and one or more operations associated with presentation and/or processing tools. In some examples, one or more operations conducted by the presentation or processing tools can be under binary control rather than direct electronic synchronization. In some examples, the triggering of an operation via a binary control signal can be dependent on the position of a master device and can still be based on a cam profile. The production devices 110 can include one or more servo-motors associated with tooling components 230, and the machine-readable instructions can be configured to cause processor 224 and/or 124 to generate signals useful in controlling the servo-motors according to a predetermined cam profile to carry out electronically synchronized operations according to the methods herein.

The production devices 110 can include a numerically synchronized control architecture. For example, transfer and presentation of workpieces (e.g. by presentation tools) according to the methods disclosed herein can include a first computer numerically controlled operation and the receiving of the workpiece (e.g. by a processing tool or another presentation tool) can include a second computer numerically controlled operation. In some examples, the loading, separating, accelerating, and delivering of workpieces can include a first computer numerically controlled operation and the receiving of the workpieces can include a second computer numerically controlled operation. In some examples, the receiving of a workpiece can include a first computer numerically controlled operation and the processing of the workpiece can include a second computer numerically controlled operation. In such examples, the first computer numerically controlled operation and the second computer numerically controlled operation can be electronically synchronized (e.g. electronically cammed).

Figure 3:
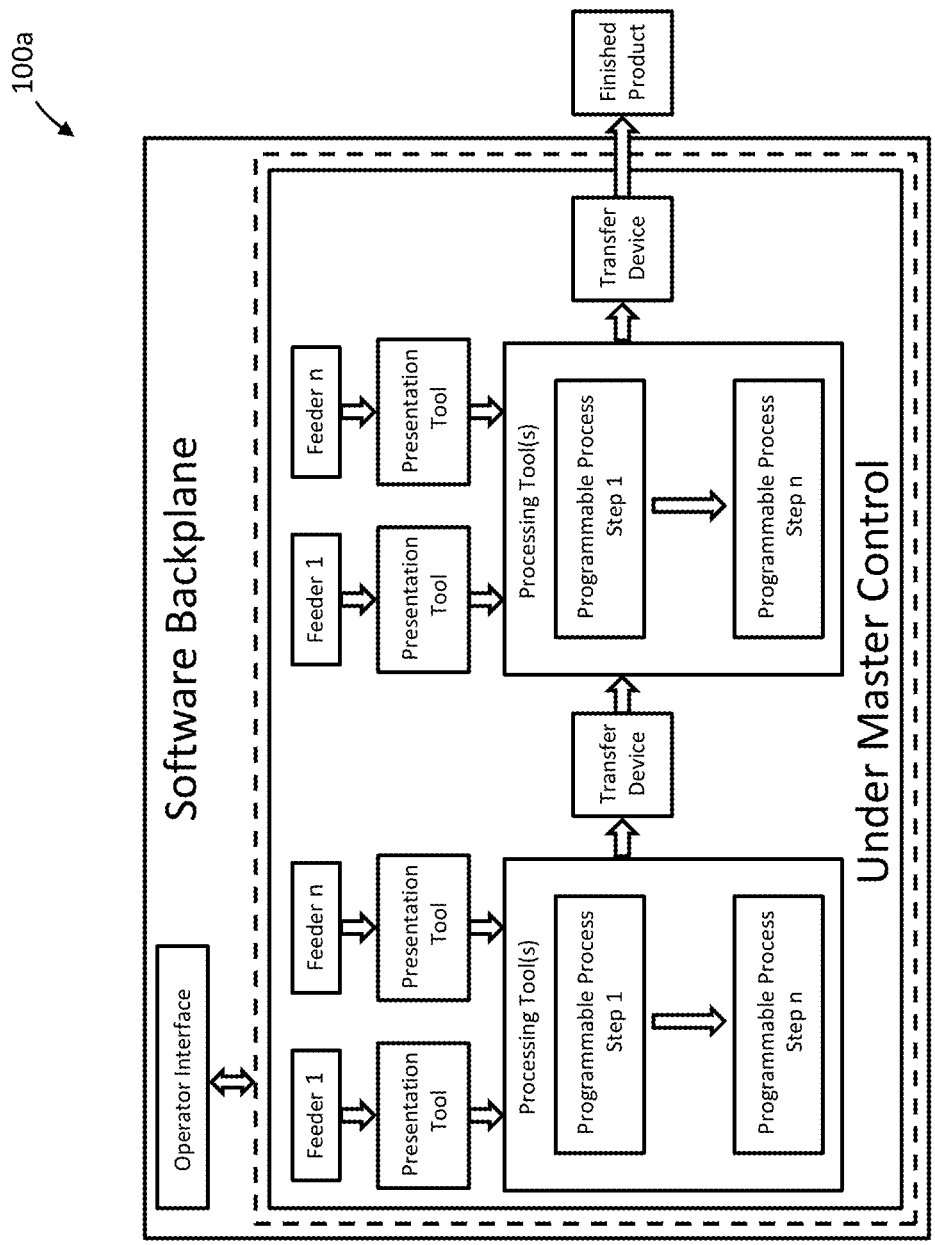
FIG. 3 is a schematic of an example implementation of the system 100 of FIG. 1.

Referring to FIG. 3, an example implementation 100a of the system 100 is shown schematically. The example system 100a can be configured to carry out steps from processes disclosed herein. System 100a can receive workpieces and/or raw materials as inputs; progressively add value to them via processing tools; and discharge them either as discrete finished products, as unfinished products, or as rejected scrap (i.e., defective products).

As shown in FIG. 3, system 100a can receive the workpieces and/or materials from one or more feeders (e.g. of a feed device) for delivering workpieces and/or materials to another presentation tool (e.g. of an indexing device). The delivery from the feeders can be done directly or via a respective buffer. Each presentation tool or transfer device (e.g. workpiece carrier) of the system 100a can be numerically controlled and configured to deliver the materials and/or workpieces to one or more processing tools (e.g. of a processing device). Each processing tool can add value to a workpiece and/or material via one or more programmable process steps. A given processing tool can operate in parallel to and/or in series with one or more other processing tools and/or presentation tools. Once the workpiece passes through a final processing tool, it can be discharged either as a successfully completed and validated finished product, as an unfinished product, or as rejected scrap. Human interaction with system 100a can be through an operator interface.

The system can include validation stations including validation devices configured to conduct inspections, checks, and/or tests on one or more of the workpieces. The validation stations can be located at, for example, one or more feeders, presentation tools, transfer devices, and/or processing tools. At these points, workpieces can be eliminated from the system as scrap if they do not meet one or more predetermined inspection criteria. Validation stations can be configured to conduct inspection, check, and/or test operations on one or more of workpieces that can be electronically synchronized with other devices, such as, for example, a master device of the production devices 110.

The various elements described above can be controlled at least in part by software resources known as base software backplane. The backplane can be configured to permit various elements of the system to carry out various control functions including: management of inputs and outputs; management of local control tasks, including programmable process steps within processing tools and local inspection tasks within validation stations; communications between different elements in the system and communication with a human user via the operator interface.

The system 100a can include a numerically synchronized control architecture. In various embodiments, the feeders, presentation tools, processing tools, and transfer devices can be numerically controlled. Movement of workpieces and materials through the system can occur along programmable axes of motion, which can be either rotary or linear. Movement of tooling associated with the programmable process steps of processing tools can also take place along programmable linear and/or rotary axes of motion.

Figure 4:
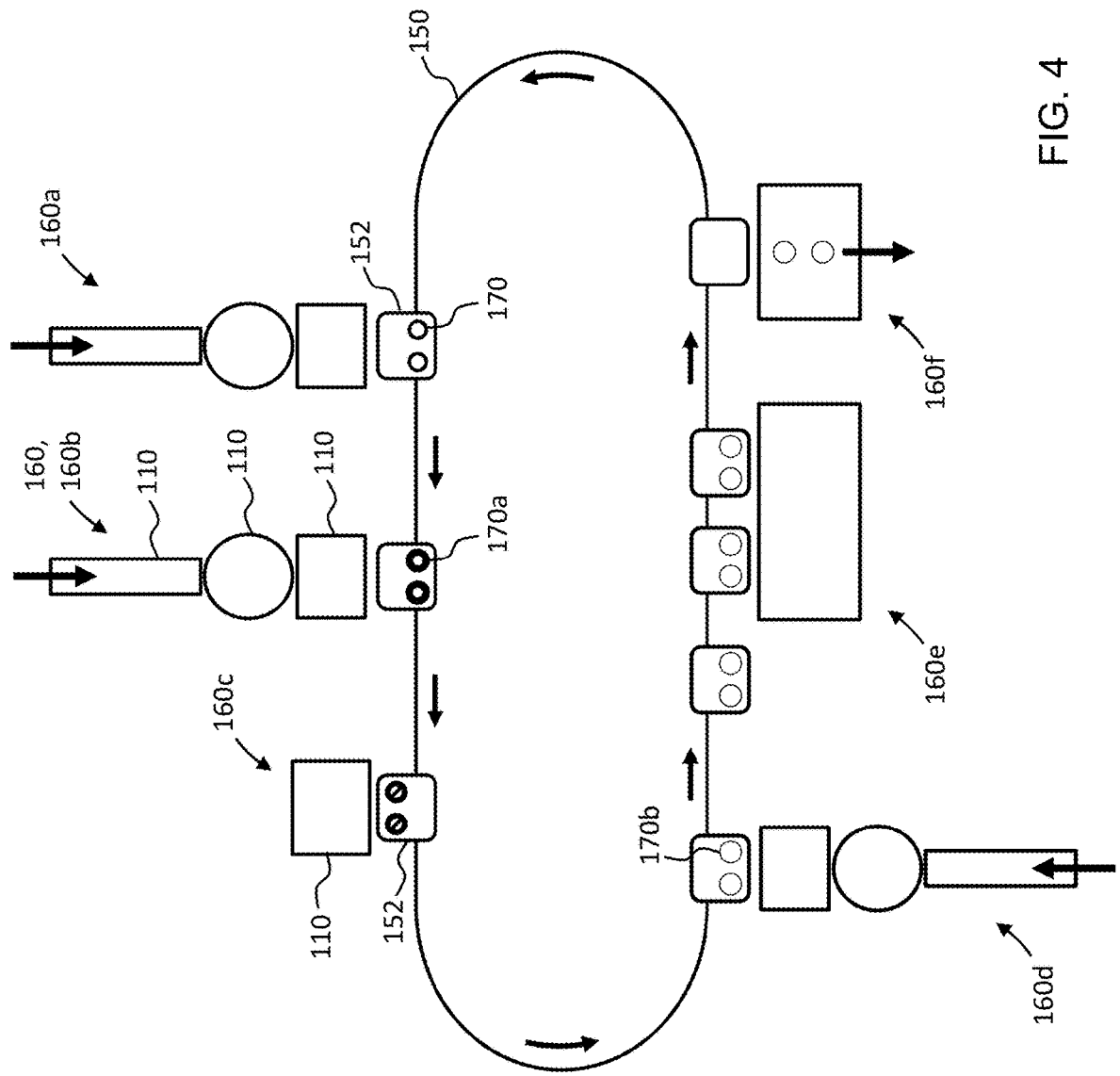
FIG. 4 is a schematic showing an example arrangement of a plurality of processing stations of the system of FIG. 1.

Referring to FIG. 4, an example arrangement of production devices 110 of the system 100 is shown schematically. In the illustrated example, the system 100 includes a transport track 150 supporting a plurality of carriers 152. Each carrier 152 comprises a pallet configured for holding at least one workpiece, and is movable along the track 150 (e.g. through one or more servo-drives) among a plurality of processing stations 160. Each processing station 160 includes one or more production devices 110 operable in electronic synchronization with each other, the carriers 152, and/or production devices 110 of other processing stations 160 for processing the workpieces.

In the example illustrated, the processing stations 160 shown in FIG. 4 include a first processing station 160a for transferring one or more workpieces 170 to each carrier 152 and a second processing station 160b for delivering and installing one or more parts (e.g. O-rings) onto the workpieces 170 held by the carrier 152 to form a first workpiece assembly 170a. The processing stations 160 of the system 100 shown in FIG. 4 further include a third processing station 160c for reorienting (e.g. inverting) the workpiece assembly 170a, and optionally repositioning the workpiece assembly 170a held by the carrier 152 and/or assembling the workpiece assembly 170a with another product part held in the carrier 152. The processing stations 160 shown in FIG. 4 further include a fourth processing station 160d for delivering and installing one or more additional product parts onto the reoriented workpiece assembly 170a held by the carrier to form a second workpiece assembly 170b, a fifth processing station 160e for validating, testing, and/or inspecting (and/or performing some other operation) on the second workpiece assembly 170b held by the carrier 152, and a sixth processing station 160f for removing the second workpiece assemblies 170b from the carrier for discharge from the system 100, either as a successfully completed and validated finished product, as an unfinished product, or as a rejected defective product.

In the example illustrated, the system 100 is configured for installation of O-rings onto workpieces 170, and the second processing station 160b can include an O-ring processing station for processing the O-rings (e.g. to install the O-rings onto corresponding workpieces 170).

Figure 5:
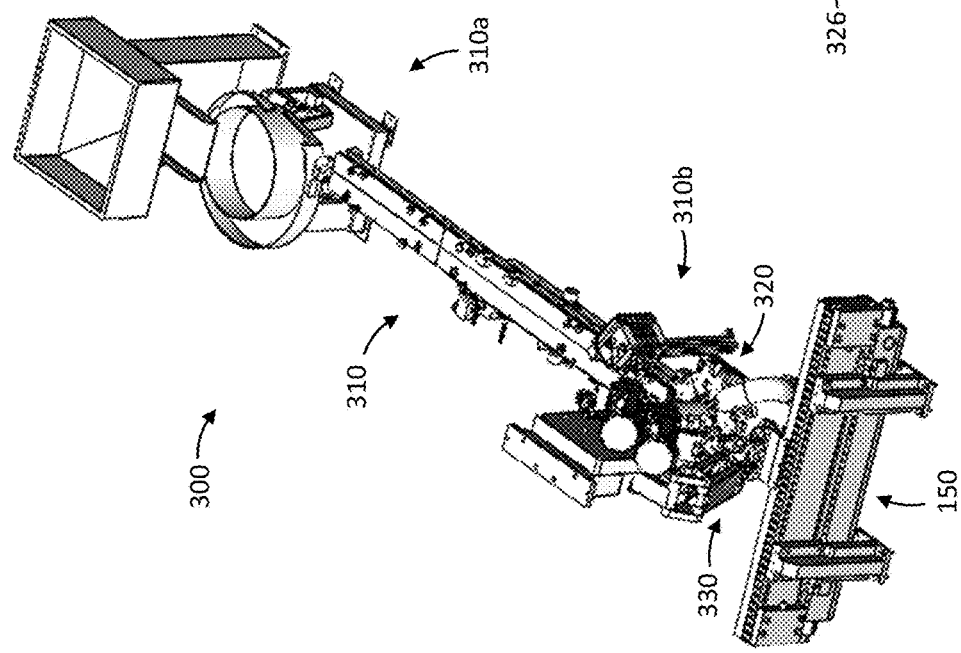
FIG. 5 is a perspective view of an example processing station of FIG. 4.

Referring to FIG. 5, an example O-ring processing station 300 (e.g. for use as the second processing station 160b in the system 100 shown in FIG. 4) is illustrated. The O-ring processing station 300 includes a plurality of production devices 110 in electronic synchronization to facilitate efficient processing of O-rings. In the example illustrated, the production devices 110 of the station 300 include a feed device 310 for conveying a stream of O-rings and separating and delivering a leading O-ring from the stream of O-rings, an indexing device 320 for receiving the O-ring from the feed device 310 and presenting the O-ring for processing, and a pick-and-place robot 330 for transferring the O-ring from the indexing device 320 to a workpiece for installation thereon.

Figure 6:
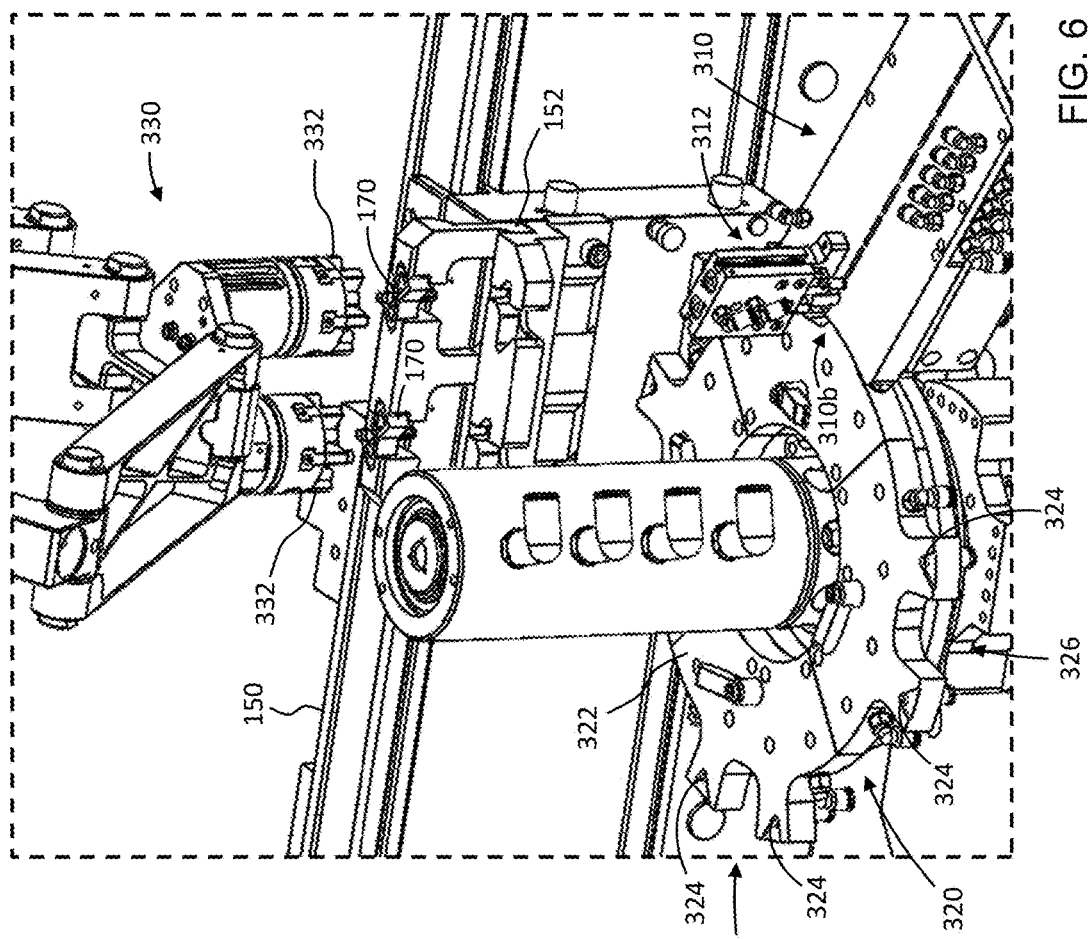
FIG. 6 is an enlarged perspective view of a portion of the processing station of FIG. 5.

In the example illustrated, the feed device 310 includes an intake end 310a for receiving the O-rings and an output end 310b opposite the intake end 310a for discharging the O-rings. Referring to FIG. 6, in the example illustrated, the feed device 310 includes a gate system 312 at the output end 310b for positioning a leading O-ring at a delivery position, separating the leading O-ring in the delivery position from trailing O-rings, and controlling discharge of the leading O-ring at the delivery position from the output end 310b.

Referring to FIG. 7, in the example illustrated, the gate system 312 includes a discharge gate 314 at the output end 310b of the feed device 310 for positioning the leading O-ring 302a at the delivery position and controlling discharge of the leading O-ring 302a, and a separation gate 316 upstream of the discharge gate 314 (and the delivery position) for controlling separation of the leading O-ring 302a from the trailing O-rings 302. The discharge gate 314 is movable between a closed position (shown in FIG. 7) for blocking advancement of the leading O-ring away from the delivery position toward the output end 310b, and an open position (shown in FIG. 9) to permit discharge of the leading O-ring from the output end 310b. The separation gate 316 is moveable between a closed position (shown in FIG. 8) for blocking advancement of trailing O-rings 302 toward the delivery position to separate the leading O-ring at the delivery position from the trailing O-rings, and an open position (shown in FIG. 7) for permitting advancement of a subsequent O-ring to the delivery position (after discharge of the leading O-ring therefrom) between the discharge and separation gates 314, 316.

Referring to FIG. 6, in the example illustrated, the indexing device 320 includes a platform 322 having a plurality of O-ring retainers 324. The platform 322 is operable to advance each retainer 324 to a loading position adjacent the output end 310b of the feed device 310 for receiving an O-ring from the feed device 310, and an unloading position spaced apart from the loading position for unloading the O-ring from the retainer 324. In the example illustrated, the platform 322 is rotatable about a vertical axis for advancing the retainers 324 through the loading and unloading positions. In the example illustrated, the retainers 324 are arranged in a plurality of retainer sets 326. In the example illustrated, each retainer set 326 includes a plurality of retainer 324 (two in the example illustrated) each movable sequentially through the loading position for receiving an O-ring from the feed device 310, and moveable together to the unloading position.

In the example illustrated, each retainer 324 comprises a retainer pocket in a radially outer periphery of the platform 322. In the example illustrated, each retainer pocket has a radially outer end open to the radially outer periphery of the platform 322 to permit sliding of an O-ring in a radial direction from the output end 310b of the feed device 310 into the retainer pocket. Each retainer pocket has a radially inner end defining a seating surface for receiving the O-ring. The retainer pocket is open to a top of the platform 322 for accommodating insertion of an end effector into the retainer pocket from above to pick up the O-ring seated in the pocket.

In the example illustrated, the pick-and-place robot 330 includes at least one end effector 332 movable between a pick-up position and a drop-off position spaced apart from the pick-up position. When in the pick-up position, the end effector is in alignment with an O-ring in a retainer 324 at the unloading position for removing the O-ring from the retainer 324. When in the drop-off position, the end effector is in alignment with a workpiece 170 held by a carrier 152 (when at a stop position along the track 150 for the station 300) for installation of the O-ring on the workpiece 170 by the end effector 332.

In the example illustrated, the robot 330 includes a plurality of the end effectors 332 (two in the example illustrated) movable together to the pick-up position. When in the pick-up position, each end effector 332 is in alignment with an O-ring in a corresponding retainer 324 of a retainer set 326 at the unloading position for picking up the O-rings simultaneously from the retainer set 326 at the unloading position.

In the example illustrated, each end effector 332 comprises a plurality of fingers movable from a contracted position, in which the fingers are insertable into an inner diameter of the O-ring, to an expanded position in which the fingers are radially outward relative to the contracted position to expand and grip the O-ring. Each end effector 332 further includes a linear actuator movable relative to the plurality of fingers from a retracted position toward an advanced position to push the O-ring off the fingers in the expanded position for releasing the O-ring onto the workpiece.

An example method of processing O-rings at the station 300 will now be described with reference to FIGS. 7 to 14. In the example illustrated, the control systems 120, 220 are configured to electronically synchronize operation of the feed device 310, indexing device 320, pick-and-place robot 330, and carriers 152 to carry out the methods described herein for processing the O-rings 302.

Referring to FIG. 7, in the example illustrated, the discharge gate 314 is closed and the separation gate 316 is open to load a leading O-ring 302a (from the stream of O-rings 302) at the delivery position adjacent the output end 310b of the feed device 310. Referring to FIG. 8, in the example illustrated, after the leading O-ring 302a is in the delivery position, the separation gate 316 is closed to separate the leading O-ring 302a from the stream of O-rings 302.

Referring to FIG. 9, in the example illustrated, an O-ring retainer 324 of the indexing device 320 is advanced toward the loading position in alignment with the output end 310b of the feed device 310. Discharge of the leading O-ring 302a from the output end 310b of the feed device 310 is initiated (e.g. through opening of the discharge gate 314 and accelerating the leading O-ring 302a toward the output end 310b). Discharge of the O-ring 302a is initiated in electronic synchronization with advancement of the O-ring retainer 324 to the loading position to initiate loading of the O-ring 302a into the retainer 324 prior to the retainer 324 arriving at the loading position. The retainer 324 is then advanced into the loading position and loading of the O-ring 302a into the retainer 324 is completed.

Figure 10:
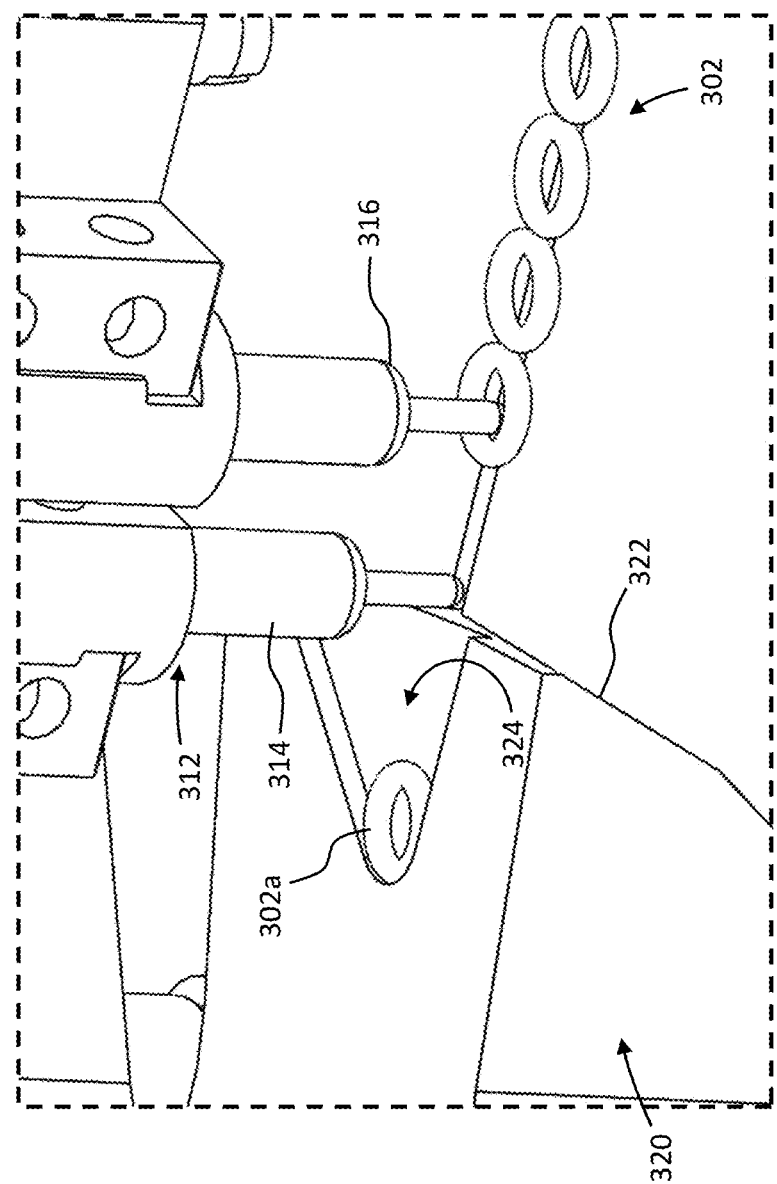

Referring to FIG. 10, after the O-ring 302a is loaded into the retainer 324, the discharge gate 314 is closed for preparing the delivery position to receive the next O-ring 302 (by opening the separation gate 316 and advancing the next O-ring 302 toward the output end 310b).

The remaining O-ring retainers 324 of the indexing device 320 are sequentially advanced through the loading position for receiving O-rings 302 in a similar manner.

Figure 11:
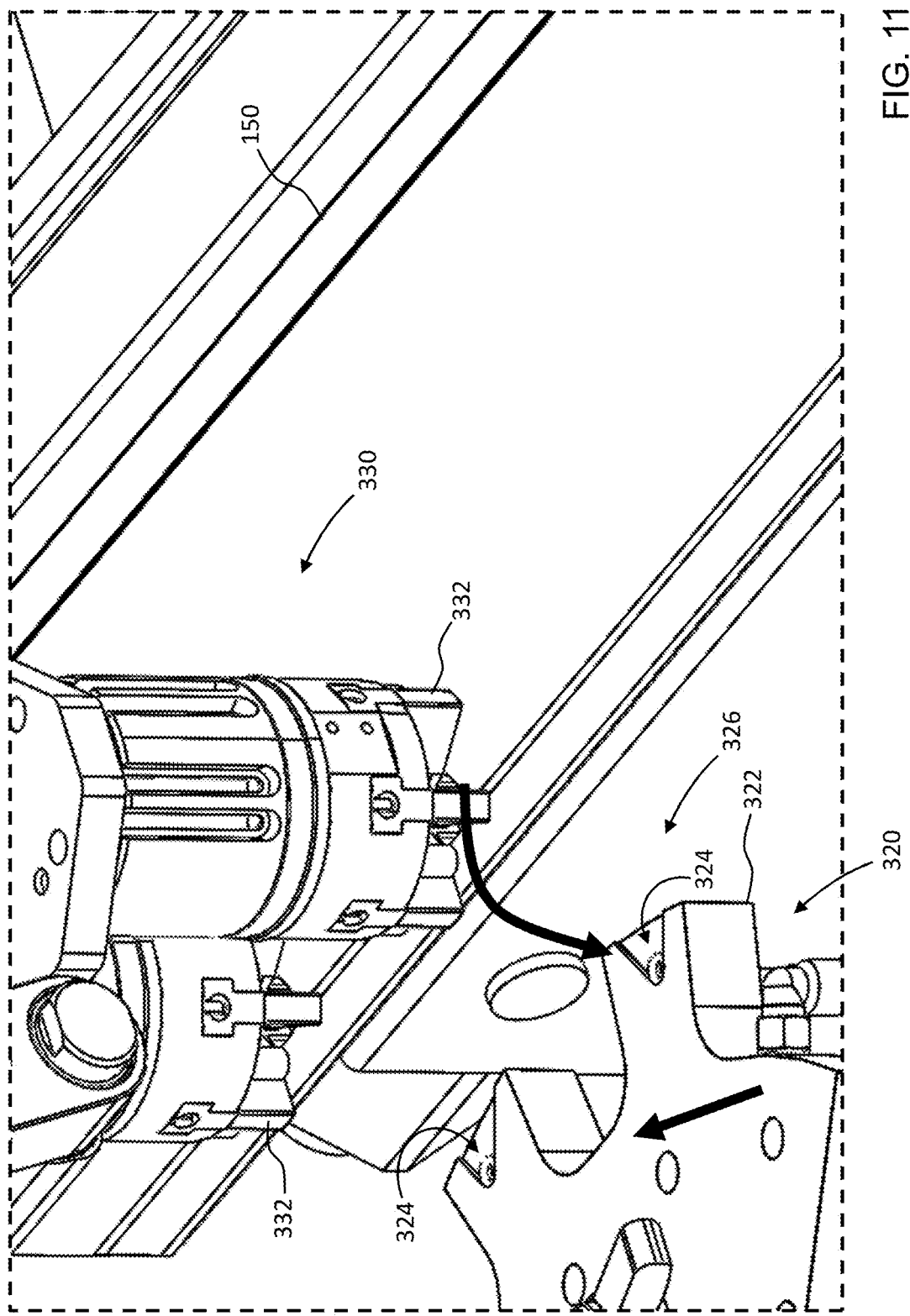
FIGS. 11 to 14 are enlarged perspective views of portions of the indexing device, pick-and-place robot, and transport track of the station of FIG. 5, showing the pick-and-place robot transferring O-rings from the indexing device to a workpiece held on a carrier on the transport track.
Figure 12:
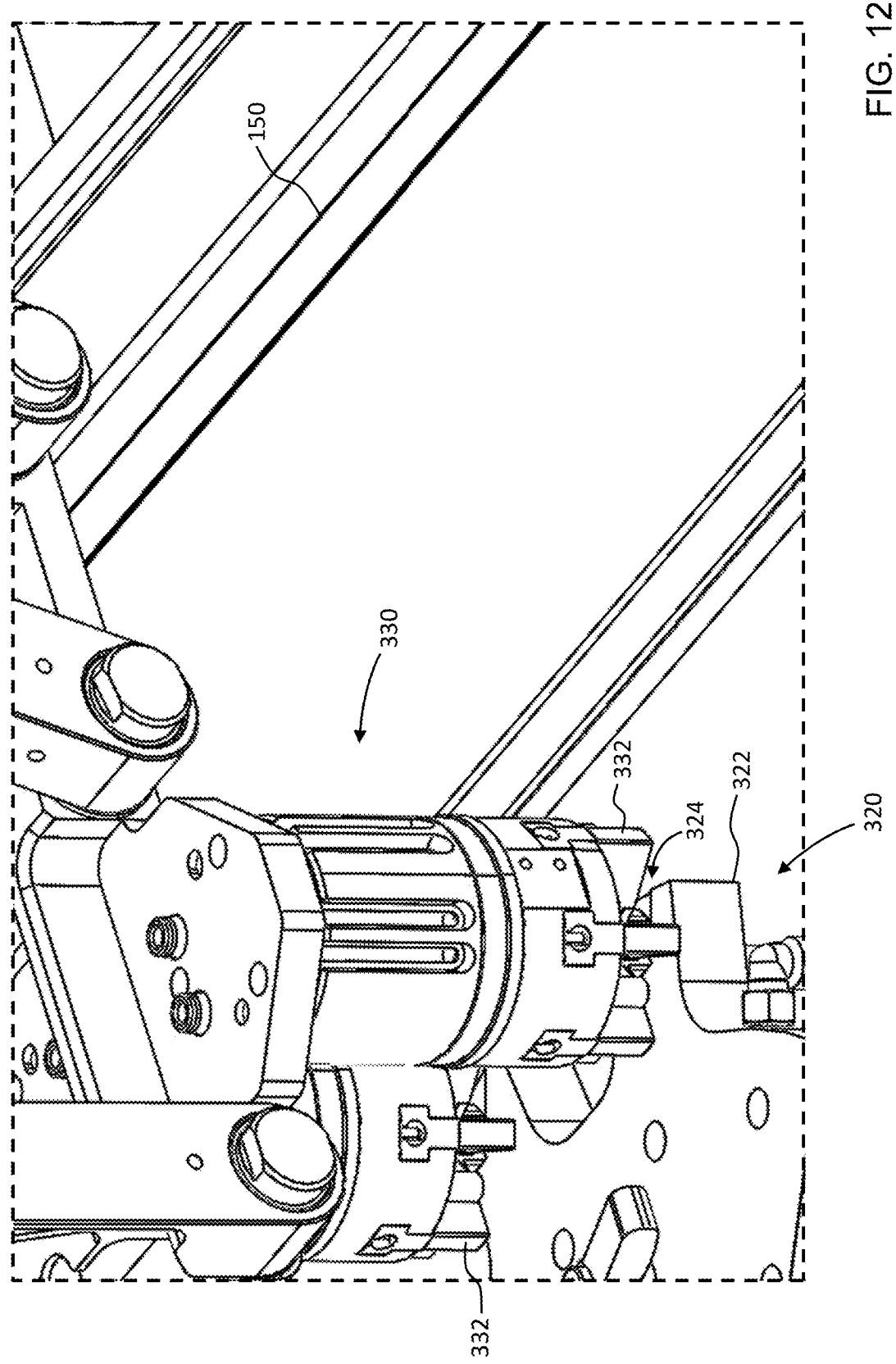
Figure 13:
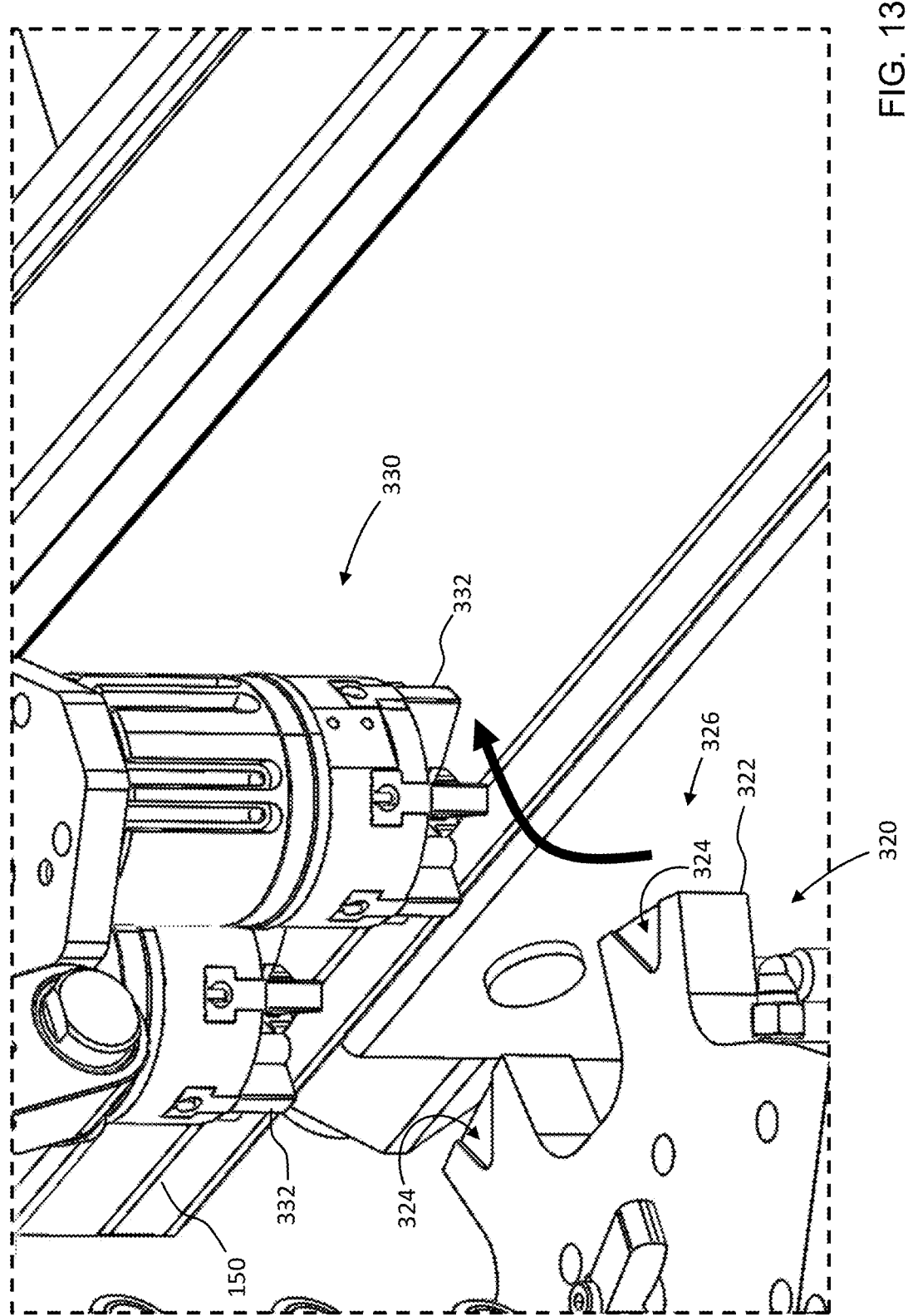
Figure 14:
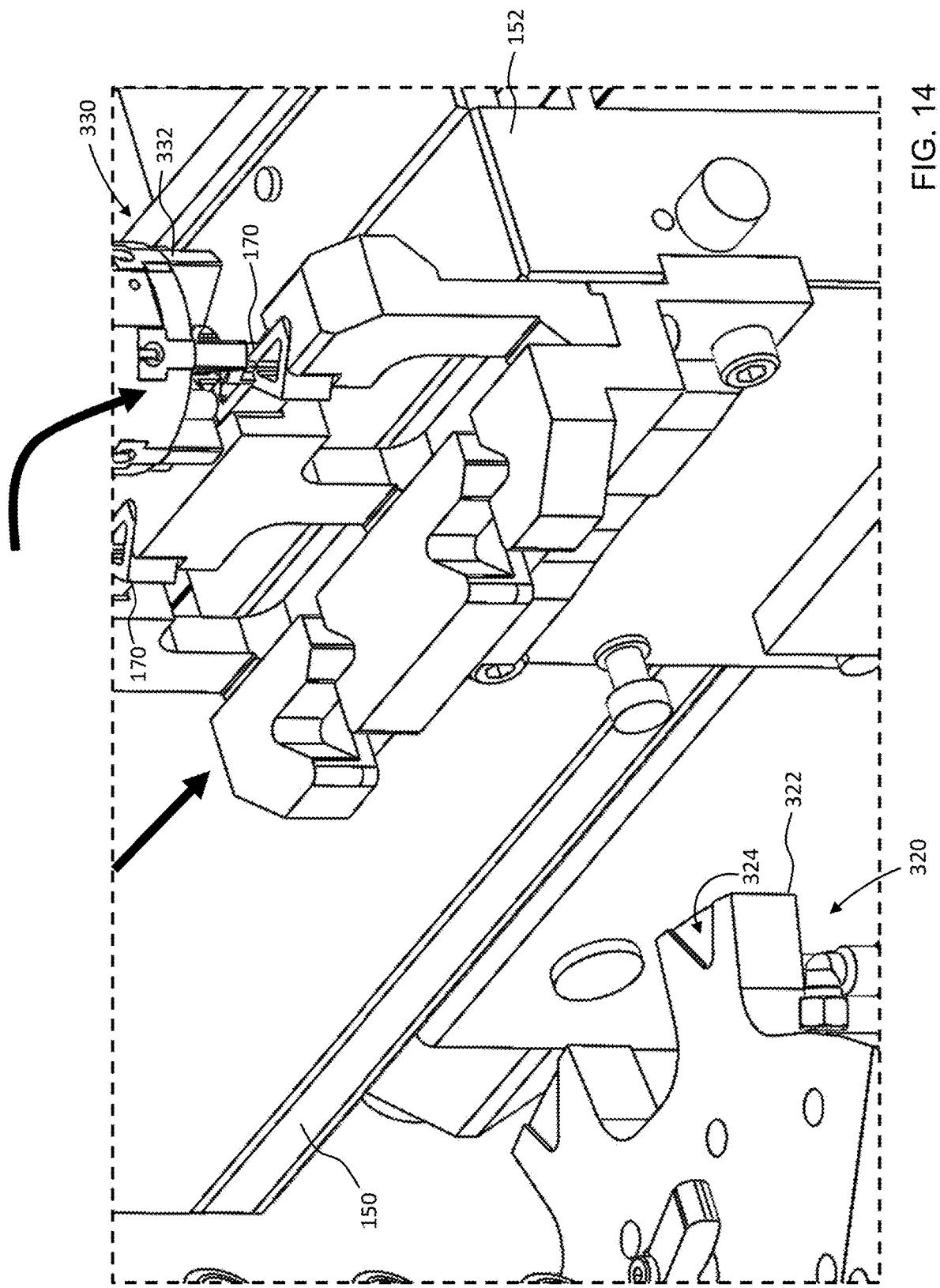

Referring to FIG. 11, after each retainer 324 of a retainer set 326 receives an O-ring, the loaded retainer set 326 is advanced toward the unloading position. The end effectors 332 are moved together in electronic synchronization with advancement of the retainer set 326 to the unloading position to synchronize arrival of the retainer set 326 at the unloading position with arrival of the end effectors 332 at the pick-up position for pick up of the O-rings in the retainer set 326 by the end effectors 332. In the example illustrated, the end effectors 332 arrive at the pick-up position after the retainer set 326 arrives at the unloading position.

After the retainer set 326 is in the unloading position and the end effectors 332 reach the pick-up position, the end effectors 332 simultaneously grip the O-rings in the retainer set 326 at the unloading position. The fingers of the end effectors 332 can be positioned in the inner diameter of the O-rings, and the end effectors 332 are moved horizontally away from the retainers 324 to slide the O-ring horizontally out from the retainers 324. During insertion into the O-rings and/or horizontal movement away from the retainers 324, the fingers of each end effector 332 can move toward the expanded position to expand and grip the O-ring.

After gripping the O-rings, the end effectors 332 are moved together in electronic synchronization with advancement of a carrier 152 along the track 150 to synchronize arrival of the carrier 152 at a stop position along the track 150 for the station 300 with arrival of the end effectors 332 at the drop-off position. In the example illustrated, the end effectors 332 arrive at the drop-off position after the carrier 152 arrives at the stop position. In the example illustrated, when at the drop-off position, each end effector 332 is in alignment with a corresponding workpiece 170 held by the carrier 152 at the stop position for simultaneous installation of the O-rings on the workpieces 170 by the end effectors 332 (e.g. by operating each end effector 332 to simultaneously release the expanded O-ring onto a corresponding groove of the workpiece 170).

The process is repeated continuously for each retainer set 326 of the indexing device 320 in sequence to install O-rings on additional workpieces held by subsequent carriers 152 in a continuous mass production process. During advancement of a first retainer set 326 to the unloading position, a first retainer 324 of a second retainer set 326 is advanced to the loading position for loading an O-ring therein. During advancement the first retainer set 326 away from the unloading position (after picking up the O-rings from that retainer set and while moving the end effectors away from the pick-up position and toward the drop-off position), a second retainer 324 of the second retainer set 326 is advanced to the loading position for loading an O-ring therein and complete loading of the second retainer set 326.

The invention claimed is:

1. An O-ring processing station for an automated mass production system, comprising:
   a) at least one feed device operable to control discharge of O-rings from an output end of the feed device;
   b) an indexing device including a platform having a plurality of O-ring retainers, the platform operable to advance each retainer to a loading position in alignment with the output end for receiving an O-ring from the feed device, and an unloading position spaced apart from the loading position for unloading the O-ring from the retainer;
   c) a pick-and-place robot including at least one end effector movable between a pick-up position in alignment with an O-ring in a retainer at the unloading position for removing the O-ring from the retainer, and a drop-off position spaced apart from the pick-up position and in alignment with a workpiece for installation of the O-ring by the end effector; and
   d) a control system for electronically synchronizing operation of the feed device, indexing device, and pick-and-place robot, the control system configured to:
      i) operate the platform to advance each retainer through the loading and unloading positions;
      ii) control discharge of a leading O-ring from the output end of the feed device in electronic synchronization with advancement of a corresponding retainer to the loading position to initiate loading of the O-ring in the retainer prior to the retainer arriving at the loading position; and
      iii) after the O-ring is loaded in the retainer, control movement of the end effector in electronic synchronization with advancement of the retainer to the unloading position to synchronize arrival of the retainer at the unloading position with arrival of the end effector at the pick-up position for pick up of the O-ring by the end effector.

2. The station of claim 1, further including a track having a plurality of carriers movable along the track, each of the carriers for holding at least one workpiece, and wherein the control system is configured to control movement of the end effector in electronic synchronization with advancement of a carrier along the track to synchronize arrival of the carrier at a stop position with arrival of the end effector at the drop-off position, in which the end effector is in alignment with the workpiece held by the carrier at the stop position for installation of the O-ring on the workpiece by the end effector.

3. The station of claim 2, wherein the control system is configured to move the end effector into the drop-off position after the carrier arrives at the stop position.

4. The station of claim 1, wherein the platform is rotatable about a vertical axis for advancing the retainers through the loading and unloading positions.

5. The station of claim 1, wherein the retainers are arranged in a plurality of retainer sets, each retainer set including at least two retainers moveable together to the unloading position, and wherein the robot includes a plurality of end effectors movable together to the pick-up position, in which each end effector is in alignment with an O-ring in a retainer of a retainer set at the unloading position for picking up the O-rings simultaneously from the retainer set at the unloading position.

6. The station of claim 1, wherein the control system is configured to move the end effector into the pick-up position after the retainer arrives at the unloading position.

7. The station of claim 1, wherein the control system is configured to, after (iii), operate the end effector to grip the O-ring.

8. The station of claim 7, wherein the control system is configured to operate each end effector to expand the O-ring through movement of a plurality of fingers of the end effector toward an expanded position during movement of the end effector from the pick-up position toward the drop-off position, and release the O-ring onto the workpiece when at the drop-off position.

9. The station of claim 1, wherein the controller is configured to continuously repeat (i) to (iii) for each retainer of the indexing device.

10. An O-ring processing station for an automated mass production system, comprising:
    a) at least one feed device operable to control discharge of O-rings from an output end of the feed device;
    b) an indexing device having a plurality of O-ring retainers, the indexing device operable to advance each retainer to a loading position in alignment with the output end for receiving an O-ring from the feed device, and an unloading position spaced apart from the loading position for unloading the O-ring from the retainer; and
    c) a pick-and-place robot including at least one end effector movable between a pick-up position in alignment with a retainer at the unloading position for removing the O-ring from the retainer, and a drop-off position spaced apart from the pick-up position for installation of the O-ring onto a workpiece.

11. The station of claim 10, further including a track having a plurality of carriers movable along the track, each carrier for holding at least one workpiece and advanceable through a stop position in alignment with the drop-off position of the end effector for installation of the O-ring on the workpiece by the end effector.

12. The station of claim 10, wherein each end effector comprises a plurality of fingers movable from a contracted position, in which the fingers are insertable into an inner diameter of the O-ring, to an expanded position in which the fingers are radially outward relative to the contracted position to grip and expand the O-ring.

13. The station of claim 10, wherein the indexing device comprises a platform relative to which the retainers are fixed, the platform rotatable about a vertical axis for advancing the retainers through the loading and unloading positions.

14. The station of claim 13, wherein each retainer comprises a retainer pocket in a radially outer periphery of the platform.

15. The station of claim 14, wherein each retainer pocket has a radially outer end open to the radially outer periphery of the platform to permit sliding of an O-ring in a radial direction from the output end of the feed device into the retainer pocket, and a radially inner end defining a seating surface for receiving the O-ring, and wherein each retainer pocket is open to a top of the platform for accommodating insertion of an end effector into the retainer pocket from above to pick up the O-ring seated in the pocket.

16. The station of claim 10, wherein the retainers are arranged in a plurality of retainer sets, each retainer set including at least two retainers moveable together to the unloading position, and wherein the pick-and-place robot includes a plurality of end effectors movable together to the pick-up position, in which each end effector is in alignment with a respective retainer of a retainer set at the unloading position for picking up O-rings simultaneously from the retainer set at the unloading position.

17. The station of claim 10, wherein the feed device includes a gate system at the output end for positioning a leading O-ring at a delivery position, separating the leading O-ring in the delivery position from trailing O-rings, and controlling discharge of the leading O-ring at the delivery position from the output end.

18. The station of claim 17, wherein the gate system includes a discharge gate at the output end for positioning the leading O-ring at the delivery position and controlling discharge of the leading O-ring, and a separation gate upstream of the discharge gate for controlling separation of the leading O-ring from the trailing O-rings.

19. The station of claim 18, wherein the discharge gate is movable between a closed position for blocking advancement of the leading O-ring away from the delivery position, and an open position to permit discharge of the leading O-ring from the output end, and the separation gate is moveable between a closed position for blocking advancement of trailing O-rings toward the delivery position to separate the leading O-ring at the delivery position from the trailing O-rings, and an open position for permitting advancement of a subsequent O-ring to the delivery position after discharge of the leading O-ring.

20. A method of operating the O-ring processing station of claim 10, comprising:
   a) advancing a retainer of the indexing device toward the loading position;
   b) discharging a leading O-ring from the output end of the feed device to load the O-ring into the retainer at the loading position;
   c) after loading the O-ring into the retainer, advancing the retainer toward the unloading position; and
   d) moving the end effector to the pick-up position to pick up the O-ring from the retainer in the unloading position.

\* \* \* \* \*